United States Patent [19]
Jaikaran

[11] Patent Number: 5,772,879
[45] Date of Patent: Jun. 30, 1998

[54] SELF-CLEANING FLUID STRAINER

[76] Inventor: Allan Jaikaran, 68 Sea View Drive, Gulf View, San Fernando, Trinidad/Tobago

[21] Appl. No.: 570,290

[22] Filed: Dec. 11, 1995

[51] Int. Cl.⁶ .................................................. B01D 63/00
[52] U.S. Cl. ........................ 210/321.69; 210/97; 210/107; 210/340; 210/341; 210/414; 210/391
[58] Field of Search ................................ 210/321.69, 85, 210/97, 107, 314, 315, 391, 396, 398, 433.1, 340, 341, 414, 483, 413

[56] References Cited

U.S. PATENT DOCUMENTS

| | | | |
|---|---|---|---|
| 2,841,287 | 7/1958 | Halbach | 210/414 |
| 3,541,004 | 11/1970 | Cooper, IV et al. | 210/414 |
| 3,750,885 | 8/1973 | Fournier | 210/107 |
| 3,785,969 | 1/1974 | Mölls et al. | 210/414 |
| 3,817,377 | 6/1974 | Piggott | 210/433.1 |
| 4,042,504 | 8/1977 | Drori | 210/107 |
| 4,486,304 | 12/1984 | Neuman et al. | 210/414 |
| 4,496,463 | 1/1985 | Desai et al. | 210/341 |
| 4,624,785 | 11/1986 | Drori | 210/414 |
| 4,693,815 | 9/1987 | Collins, Jr. | 210/107 |
| 4,867,879 | 9/1989 | Müller | 210/392 |
| 4,923,068 | 5/1990 | Crowson | 210/340 |
| 5,128,029 | 7/1992 | Herrmann | 210/413 |
| 5,194,160 | 3/1993 | Simonelli et al. | 210/90 |
| 5,415,781 | 5/1995 | Randhahn et al. | 210/321.69 |
| 5,443,792 | 8/1995 | Desai et al. | 210/340 |
| 5,453,194 | 9/1995 | Klein | 210/415 |

Primary Examiner—Ana Fortuna
Attorney, Agent, or Firm—Gunn & Associates, P.C.

[57] ABSTRACT

A pair of strainer systems in parallel provide continuous filtration of solids from an influent stream. In influent strikes a filtration medium in the form of a porous membrane at an angle other than the perpendicular to create a washing action to remove filtrate from the surface of the porous membrane. As filtrate builds up on the surface of the porous membrane, the pressure differential across the strainer increases to a first setpoint which activates a motor which drives a wiper blade to scrub filtrate off the surface of the porous membrane. Ultimately, solids build up within the pores of the porous membrane to a point where the wiper blade is no longer effective to lower the differential pressure across the strainer to an acceptable level. When this happens, a differential pressure signal isolates the operations strainer and places the standby, parallel strainer in service. Filtrate scrubbed from the surface of the porous membrane is collected in a sump and occasionally drained or flushed from the system.

11 Claims, 6 Drawing Sheets

SELF-CLEANING FLUID STRAINER

FIELD OF THE INVENTION

The present invention relates generally to the field of self-cleaning strainers and, more specifically, to an in-line self-cleaning strainer that serves as either a stand-alone filtration system or a pre-filtration element for domestic water, chemicals, pharmaceuticals, and other fluids.

BACKGROUND OF THE INVENTION

In the process of recovering fresh water for use as domestic or potable water, water is drawn from water wells and other clean sources such as streams, rivers, lakes, reservoirs, and the like. This raw water is treated through a series of well known steps before it is distributed to consumers. The treatment steps include aeration which oxidizes certain soluble salts into insoluble salts. This oxidation process produces a suspension of the insoluble salts in the water. In addition to the suspension of the insoluble salts, the water may contain sand and/or clay particles. The fine clay particles are also held in suspension.

Domestic water needs to be clarified before it can be disinfected and introduced into water mains. The clarification of water requires a flocculating agent such as sodium meta-bisulfide or aluminum sulfate (alum) to collect these micron sized particles, insoluble salts, and clay particles, and hold them together, so that they can be removed by filtration.

The normal method of filtration uses a filter with one or more filter media. The filtrate deposited in the filter increases the differential pressure across the filter. Filters commonly need to be back-washed using clean filtered water and compressed air to scour the filter media to remove accumulated filtered particles. During this period of back-washing, the filter is unavailable for service, perhaps for an extended period of time. Thus, there remains a need for a system and method that extends the period of time between maintenance on the filter by back-washing or other cleaning procedures.

In the petroleum industry, crude oil is produced in certain instances from sandstone reservoirs. If the oil producing reservoirs are consolidated with good cementation of the sand matrix, very little sand is produced. If the oil producing reservoirs are unconsolidated, sand is normally produced with the crude oil. Generally, it is better to use some form of sand control than to produce formation sand. The need for the application of some means of sand control is determined by the level of production of the well, and, for most old wells with low production rates, sand control is considered uneconomic. For these low producing wells, which produce some sand, a strainer or filtering means placed before the gathering manifold or before the separator, will remove sand from the production system. Sand in the production system fouls up the separator, tank, and main oil lines. In addition, the sand can damage piping, control and dump valves, and even the gathering station pump. Thus, there remains a need for an in-line filtering means that will effectively remove entrained sand that will not itself slow the flow of production fluid.

Known self-cleaning strainers are limited in the smallest size of particle which such a strainer can remove. The self-cleaning strainers available on the market can remove particle sizes to as small as 240 microns. This type of strainer allows a large percentage of solids, smaller than 240 microns, to remain in the process stream. For example, this type of strainer is not particularly useful in the process of winning crude oil, since it cannot effectively remove much of the produced sand. Based on laboratory tests, produced sand is generally sized between 320 and 44 microns.

Known self-cleaning strainers commonly use either a commercially available wire mesh or a slotted circular cylinder of known slot sizes. The selection of the type of wire mesh is generally based on the analysis of the contaminant in the process stream—size analysis, the viscosity of the process stream, and the allowable pressure differential across the wire mesh. As a rule, the higher the viscosity, the larger the self-cleaning strainer. In addition, the smallest particle size removed is limited to the smallest wire mesh available. Slotted circular cylinders are limited to the smallest slot which can be machined, and are not considered as an effective self cleaning strainer because of the limited slot size available.

Thus, there remains a need for a self-cleaning strainer that effectively removes entrained solids, particularly sand, of less than 240 microns, even 44 microns or less, without excessive pressure drop across the strainer and without degradation of production performance.

SUMMARY OF THE INVENTION

The self-cleaning strainer of the present invention solves these and other problems noted in the prior art.

The self-cleaning strainer of the present invention, when placed upstream of a system filter or other element, or as a stand-alone strainer, removes accumulated particles up to a predetermined level of the accumulation of filtrate, and substantially extends the time the filter is in use before backwashing is required. This provides savings in terms of clean fresh water (for backwashing) and energy expended by the back-wash pumps and air compressor. The energy required to maintain the self-cleaning strainer in operation is small compared to known systems.

In certain manufacturing industries, where there is a need in the manufacturing process for the separation of solids from liquids and/or gases, the self-cleaning strainer of the present invention can be used in the process if the size of the solids is above the selected pore size of the self-cleaning strainer.

The self-cleaning strainer of the present invention seeks to remove solids from liquids and gas streams by the removal of solid particles to a pre-set level. The pre-set level of solid removal is limited by a porous membrane which is the filtration element. The porous membrane can effectively remove solids that would normally pass through a slotted cylinder or a wire mesh. Thus, it has a greater capacity for solids removal. In the present invention, a liquid or gaseous process stream impinges on the porous membrane at an angle which causes the filtrate to be removed by the washing action caused by the angle of attack of the process stream on the porous membrane.

The process stream flowing across the porous membrane initially develops a small pressure differential across the porous membrane when the membrane is clean. The washing action on the surface of the porous membrane removes most but not all the filtrate built up on the surface of the membrane. The deposition of the filtrate on the surface of the porous membrane causes the differential pressure across the porous membrane to increase from its original value because of the reduced unrestricted surface area available to the process stream.

A set of differential pressure cells across the strainer incorporating the porous membrane monitors the state of the filtrate build up on the surface of the porous membrane. At a pre-set value, the differential pressure cell starts a motor coupled to a wiper blade positioned against the upstream side of the porous membrane and the wiper blade removes filtrate deposited on the surface of the porous membrane. The wiper blade rotates from the center of axis of the porous membrane and is kept in place by a spring-loaded, cone-shaped ball bearing in which the outer race of the ball bearing fits snugly in a recess formed on the lee side of the process stream. The wiper blade is also spring loaded to ensure that it impinges throughout it length on the surface of the porous membrane.

The porous membrane is held at right angles to the axis of rotation of the shaft which rotates the wiper blade. The shaft, which rotates the wiper blade, is driven by the motor (electric, explosion-proof, pneumatic, or hydraulic for areas with flammable or explosive materials). As the filtrate is deposited on the surface of the porous membrane, the differential pressure across the porous membrane increases. At a pre-determined differential pressure, the motor is turned on and the wiper blade is rotated to remove the filtrate. The motor that drives the wiper blade can also be time-set so that a few periodic rotations of the wiper blade are made before the wiper blade is stopped.

The filtrate removed from the porous membrane is concentrated in a low flow-rate portion of the liquid stream. The incoming liquid forces the filtrate-laden liquid to the back of the inlet chamber where the velocity of filtrate laden process liquid is relatively small and the filtrate is removed from the process stream by gravity segregation to a solids collection sump. The solids can be drained out by the periodic opening of a drain valve. In the case of the crude oil winning industry, the concentrated sandy oil which has been removed can be further separated by using commercially available washing systems, which removes the sand from the oil by washing with water. The water is recycled through the system. The oil is separated from the water and collected. The washed sand can be disposed as determined by existing laws in the jurisdiction of use.

The selection of the porous membrane is important to the operation of the self-cleaning strainer. The porous membrane generally has to be able to exclude all solids larger than a predetermined minimum size. In the event that this is not possible, and, where some solids are allowed to migrate through the porous membrane, the porous membrane will eventually be saturated with solid materials and the porous membrane will cease to function properly. In instances where continuous filtration is required, a second, stand-by filter bank, similar to the first bank, is used to allow for automatic switching between filtration banks. The switching takes place when a pre-set differential pressure, higher than the first differential pressure that activates the wiper motor, is reached. When the second, higher differential pressure across the operating strainer is reached, the differential pressure cell switches to the second filter bank. This may be included in telemetry systems so that the first bank can be repaired or flushed and put on standby.

The second differential pressure must allow for mechanical advantage based on the burst strength of the porous membrane. The second differential pressure, when reached, will indicate that the porous membrane has filtrate within the pore spaces of the membrane in addition to the filtrate at the surface of the membrane. After the first bank has been isolated and the internal pressure bled off, the chamber containing the porous membrane, the wiper blade, the motor and shaft can be removed from the housing and replaced or otherwise restored to functional condition.

Sintered porous stainless steel is one example of a porous membrane which can be used. It has a very smooth surface and has a defined pore space. Sintered porous stainless steel is commercially available in ⅛" sheets and the sheets are generally manufactured to 20 and 40 microns (0.0008" and 0.0016") pore space. The selection of the micron size of the porous membrane has to take into consideration the size of particle to be removed and the viscosity of the liquid in the process stream. The overall size of the strainer system may then be scaled to accommodate the desired flow rate.

These and other features and advantages of the present invention will be immediately apparent to those of skill in the art from a review of the following detailed description along with the accompanying drawings.

DETAILED DESCRIPTION OF A PREFERRED EMBODIMENT

The following detailed description details the various components that make up the insert type self-cleaning strainer of the present invention, describes the assembled strainer in its intended environment, and then describes the fluid flow in an operating insert type self-cleaning strainer.

Figure 1:
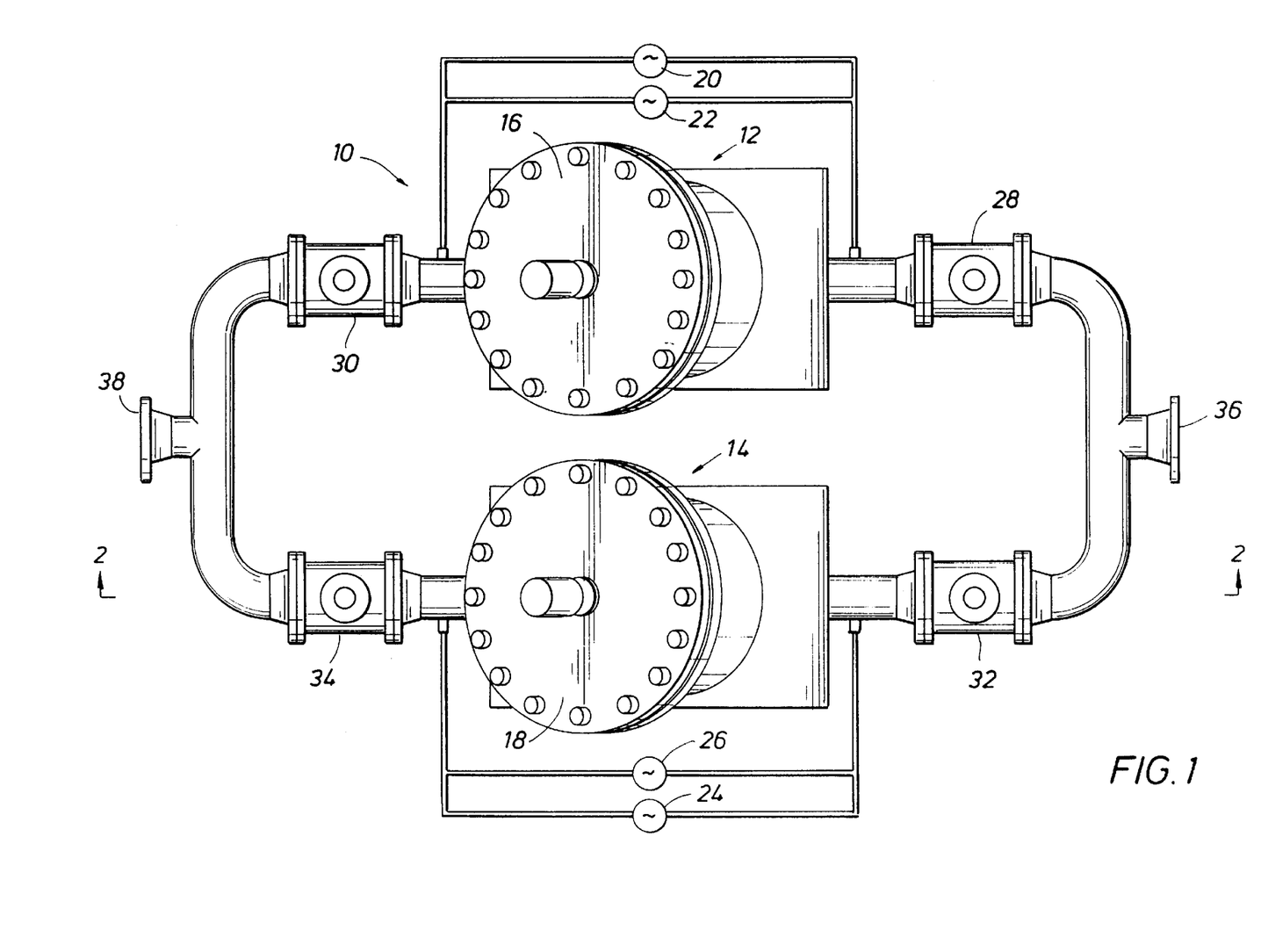
FIG. 1 depicts a plan view showing two self-cleaning strainers in parallel with the differential pressure cells attached.

FIG. 1 shows a plan view of a strainer system 10 comprising two insert-type self-cleaning strainers 12 and 14 in parallel. A cover plate 16 provides access to the internals of the strainer 12, including a porous membrane can, as described below with regard to FIG. 2. Similarly, a cover plate 18 provides access to the internals of the strainer 14.

A pair of differential pressure cells 20 and 22 are coupled across the self-cleaning strainer 12 by instrument lines on either side of the strainer 12. A pair of differential pressure cells 24 and 26 are similarly coupled across the strainer 14. The differential pressure cells 20, 22, 24, and 26 provide detection and control function controls with regard to the strainer alignment. The strainer 12 is provided with an inlet isolation valve 28 and an outlet isolation valve 30. The valves 28 and 30 are actuated by electric, hydraulic, or pneumatic devices to respond to a signal from one of the differential pressure cells 20, 22, 24, or 26. The strainer 14 is similarly provided with an inlet isolation valve 32 and an outlet isolation valve 34. The isolation valves 32 and 34 are also actuated in response to a signal from one of the differential pressure cells. The system 10 is arranged so that, upon exceeding a predetermined differential pressure across the strainer that is currently on line, one of the differential pressure cells will develop a signal that isolates the strainer with the excessive differential pressure and place the stand-by strainer on line.

Flow enters the strainer system through a flanged nozzle 36 in FIG. 1. If the strainer 14 is on line, the solids-bearing fluid flows through the valve 32 and enters the insert type self-cleaning strainer 14. The fluid stream with solids removed leaves the strainer through the valve 34 and exits through a flanged nozzle 38. The differential pressure across the strainer 14 is continuously monitored by the differential pressure cells 24 and 26.

Figure 2:
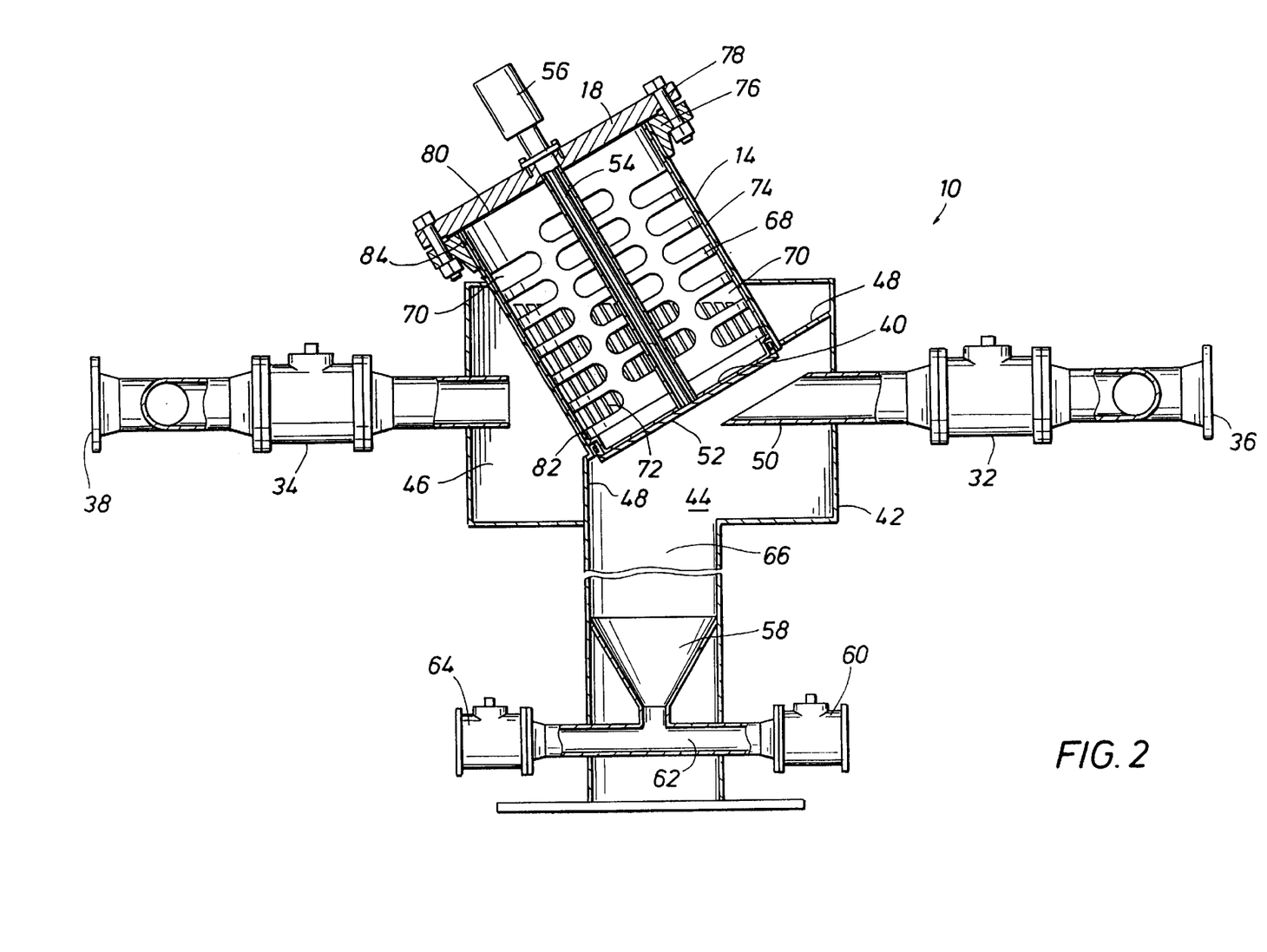
FIG. 2 depicts the section in the line of cross section A—A of FIG. 1 and further showing the inlet and outlet paths of the process stream and the outlet path of the filtrate.

FIG. 2 displays a section view of the system 10 as taken along the section A—A in FIG. 1. As shown in FIG. 2, solids-laden influent enters the system at the flanged nozzle 36. The influent passes through the inlet isolation valve 32 and into a filtration chamber 42. The filtration chamber comprises the strainer 14, an inlet plenum 44, and an outlet plenum 46. The inlet and outlet plenums are separated by a divider plate 48, which also partially supports the strainer 14.

At the inlet to the strainer 14 (and the strainer 12) is a porous membrane 40. Influent is introduced into the inlet plenum 44 through an inlet pipe 50, which preferably penetrates the wall of the filtration chamber 42, to direct influent at an angle onto the surface of the porous membrane 40. This feature provides a scrubbing action which helps to reduce the rate at which filtered solid filtrate will build up on the surface of the porous membrane.

On the inlet surface of the porous membrane 40 is a wiper blade or brush 52. The wiper blade 52 is mounted on a shaft 54 which is coupled to a motor 56 or other appropriate prime mover. The control signal for activation of the motor 56 is provided by the differential pressure cell 24. As filtrate builds up on the inlet surface of the porous membrane, the differential pressure across the strainer 14 increases. At a pre-set differential pressure, the differential pressure cell 24 switches on the motor 56 which actuates the wiper blade 52. This pre-set differential pressure is higher than the differential pressure when the porous membrane of the strainer is clean. The wiper blade removes the filtrate from the surface of the porous membrane. When the build up of filtrate becomes excessive and there is an intrusion of filtrate in the form of very fine particles into the porous membrane, the differential pressure increases beyond the pre-set limit of the cell 24.

The pressure cell 26 is set at a second, higher differential pressure. Once this higher differential pressure across the strainer is reached, the second differential pressure cell 26 sends a signal to open the outlet valve 30 and then the inlet valve 28. This puts the strainer 12 on stream, with its monitoring differential pressure cells 20 and 22. On a telemetry system, the cell 26 also signals the unavailability of the strainer 14. The signal from the cell 26 also causes the closing of the inlet valves 32 and finally the outlet isolation valve 34, thus isolating the strainer 14. The strainer 14 may then be restored and placed on standby status as described below.

During the actuation of the wiper blade to scrub filtrate from the surface of the porous membrane, a fluid heavily laden with filtrate is developed at the porous membrane. Because the filtrate-laden fluid is heavier than the influent entering the filtration chamber 42, gravity segregation takes place and the filtrate settles into a collection sump 58 in communication with the inlet plenum 44. The sediment that settles into the sump 58 is removed as necessary by opening a drain valve 60. The drain valve 60 may be automatically operated based on a timed sequence (based upon experience) dependent upon the filtrate loading of the influent, the porous membrane, or the sump 58. If the loading of the filtrate in the sump is enough to plug off exit piping 62, high pressure water can be introduced via a flush valve 64 to flush the filtrate through the drain valve 60. Alternatively, a liquid/liquid float switch (not shown) which can differentiate the densities of water and the filtrate-laden fluid can be included in the collection sump 58. This feature allows for the introduction of a fluid of a greater density and a lower viscosity than the process fluid into the collection sump 58 and then to the exit piping 62. This introduced fluid will assist in settling of the filtrate in a still area 66 to more readily remove the filtrate. The rate that filtrate settles is proportional to the viscosity of the fluid containing the filtrate.

After fluid passes through the porous membrane 40, the clean fluid enters a porous membrane can 68 and exits the can through a plurality of circumferential or lateral slots 70 of the porous membrane can 68 and a plurality of longitudinal slots 72 in a cylindrical housing 74. The clean fluid enters the outlet plenum chamber 46 and exits the strainer via the valve 34 and the flanged nozzle 38.

A flange 76 receives a plurality of bolts 78 to secure the cover plate 18 to the cylindrical housing 74. This combination retains the porous membrane can 68 within the cylindrical housing 74. The flange 76 may be either commercially available weld neck or slip-on style and the cover plate 18 may be a commercially available blind flange that has been machined and modified to receive the porous membrane can 68 with the wiper 52. A commercially available gasket 80 seals the cover plate to the cylindrical housing. Sealing between the porous membrane can 68 and the cylindrical housing 74 is by two sets of O-rings 82 and 84. The lower O-ring set 82 prevents the clean fluid from being contaminated by the higher pressure contaminated fluid, while the upper O-ring set 84 prevents the leakage of clean fluid to the environment. The gasket 80 also prevents any leakage to the environment.

Figure 3:
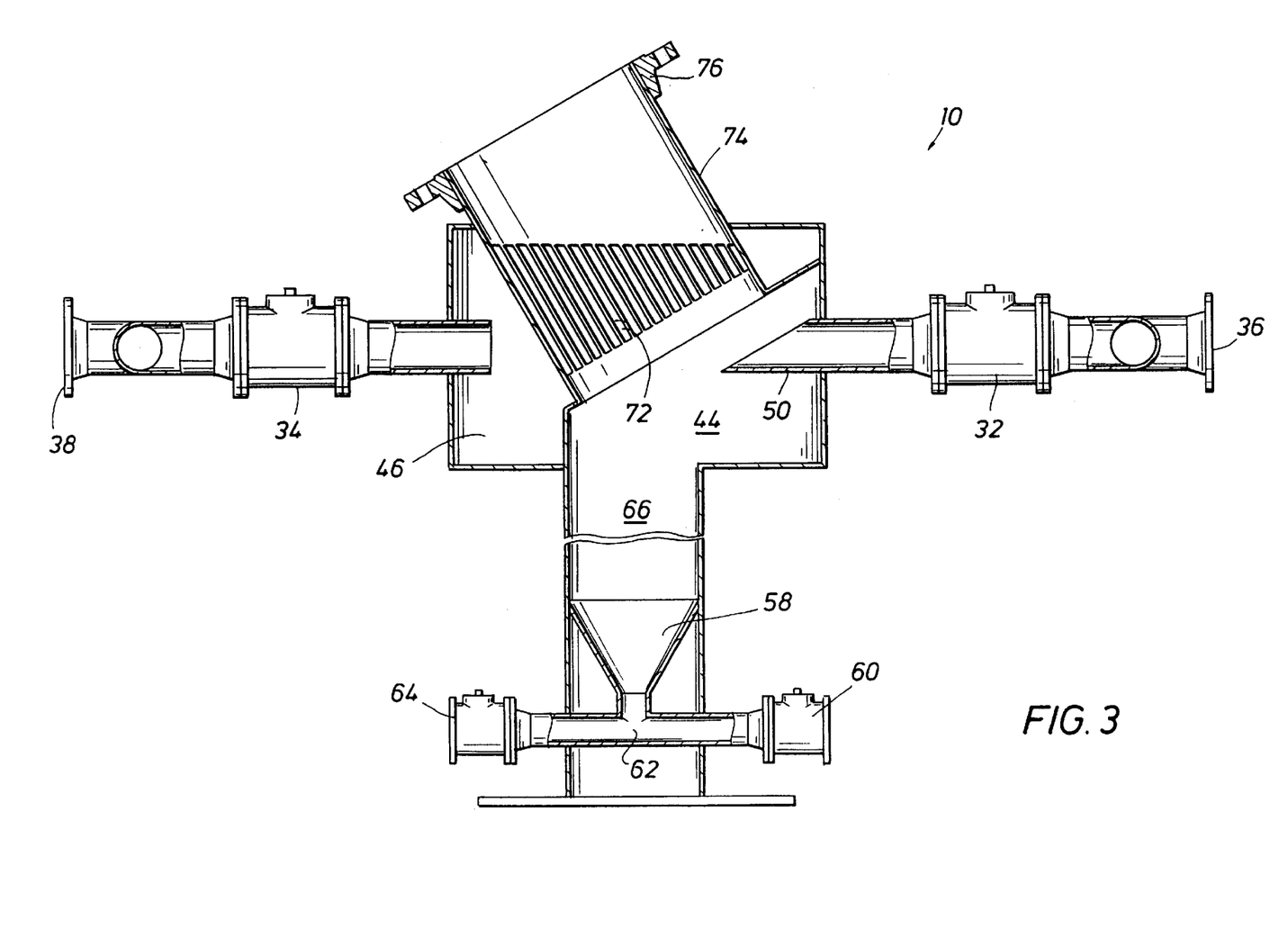
FIG. 3 depicts the section in the line of cross section A—A of FIG. 1 and further showing the self-cleaning strainer with the internal parts removed.

For ease of illustration, FIG. 3 shows the self-cleaning strainer of the present invention with the porous membrane can and associated elements removed. The structure of the open-ended cylindrical housing 74 is shown with the longitudinal slots 72 in the housing 74. Thus, the slots 72 provide a flow path for the clean fluid from the housing 74 into the outlet plenum 46. The slots are located above the lower O-ring set 82 and within the outlet plenum.

Figures 4, 7:
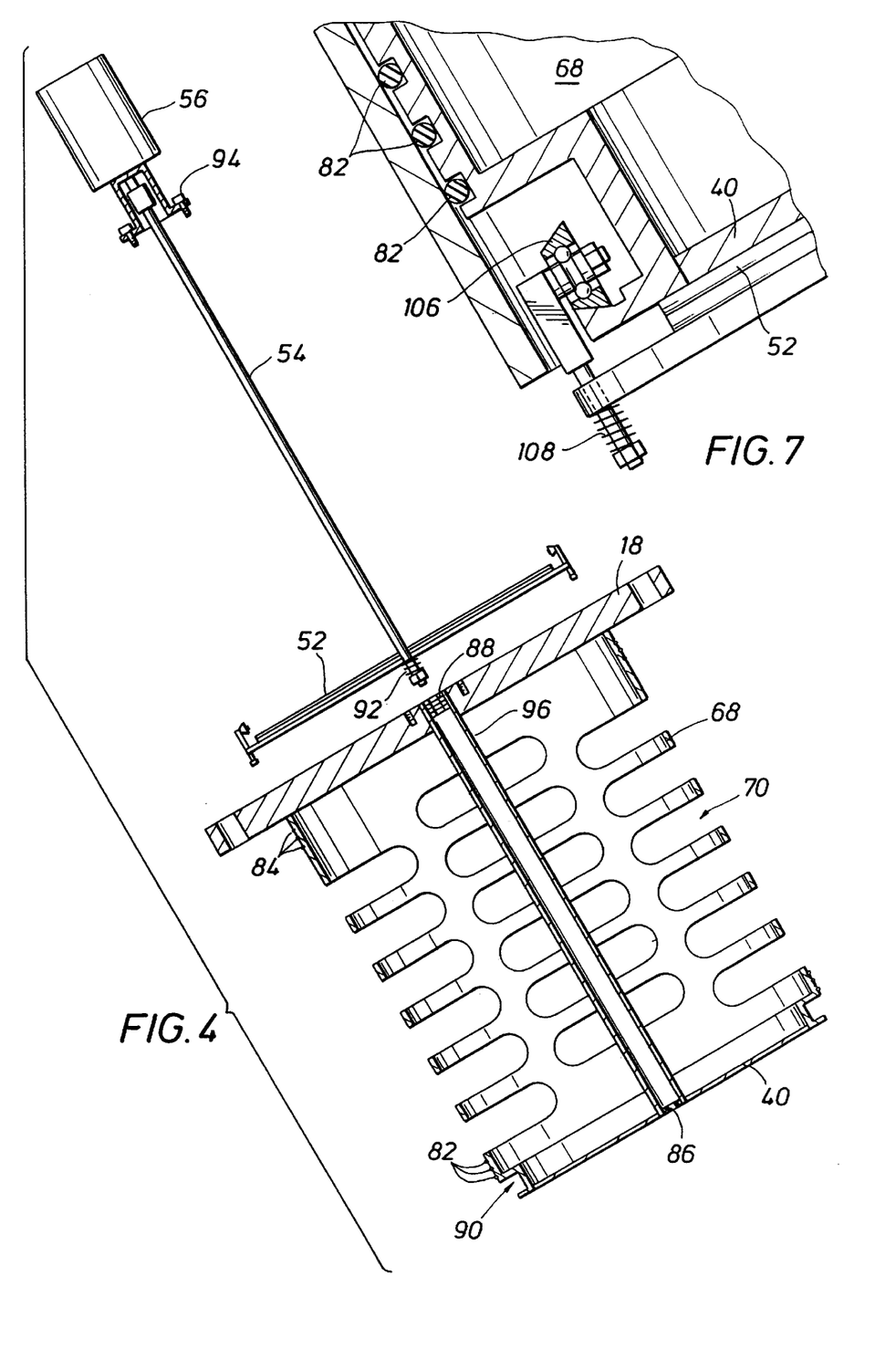
FIG. 4 depicts the section in the line of cross section A—A of FIG. 1 and further showing the internal parts which are the porous membrane can and the wiper motor, shaft, and blade forming a common element.
FIG. 7 depicts greater detail of the spring loaded cone shaped ball bearing which assists in holding the wiper blade in place. It also shows the sealing rings between the porous membrane can and the open-ended slotted cylinder.

FIG. 4 depicts an exploded view of the porous membrane can 68 with its circumferential or lateral slots 70, the porous membrane 40, the cover plate 18 (or 16), and the lower set of O-rings 82 and the upper set of O-rings 84. A sealed bearing assembly 86 provides bearing support for the wiper blade shaft 54. A gland assembly 88 for the top of the wiper blade shaft allows for lubrication of the shaft 54 but prevents the leakage of clean fluid around the shaft and through the cover plate.

A recess 90 formed on the lee side of the process stream constrains the movement of a cone shaped ball bearing as described below in greater detail with regard to FIG. 7. This, together with a compression spring 92 fitted to the end of the wiper blade shaft 54 holds the wiper blade 52 onto the porous membrane 40 in forced contact. A bolting assembly 94 mounts the wiper motor 56 and the shaft 54 into the gland arrangement 88. A restricting tube 96 is placed inside the porous membrane can 68 to allow for the wiper blade shaft 54 to be placed within it and to allow for the rotation of the wiper blade shaft 54. This restricting tube 96 excludes any clean fluid from entering the sealed bearing assembly 86 or the gland assembly 88.

Figure 5:
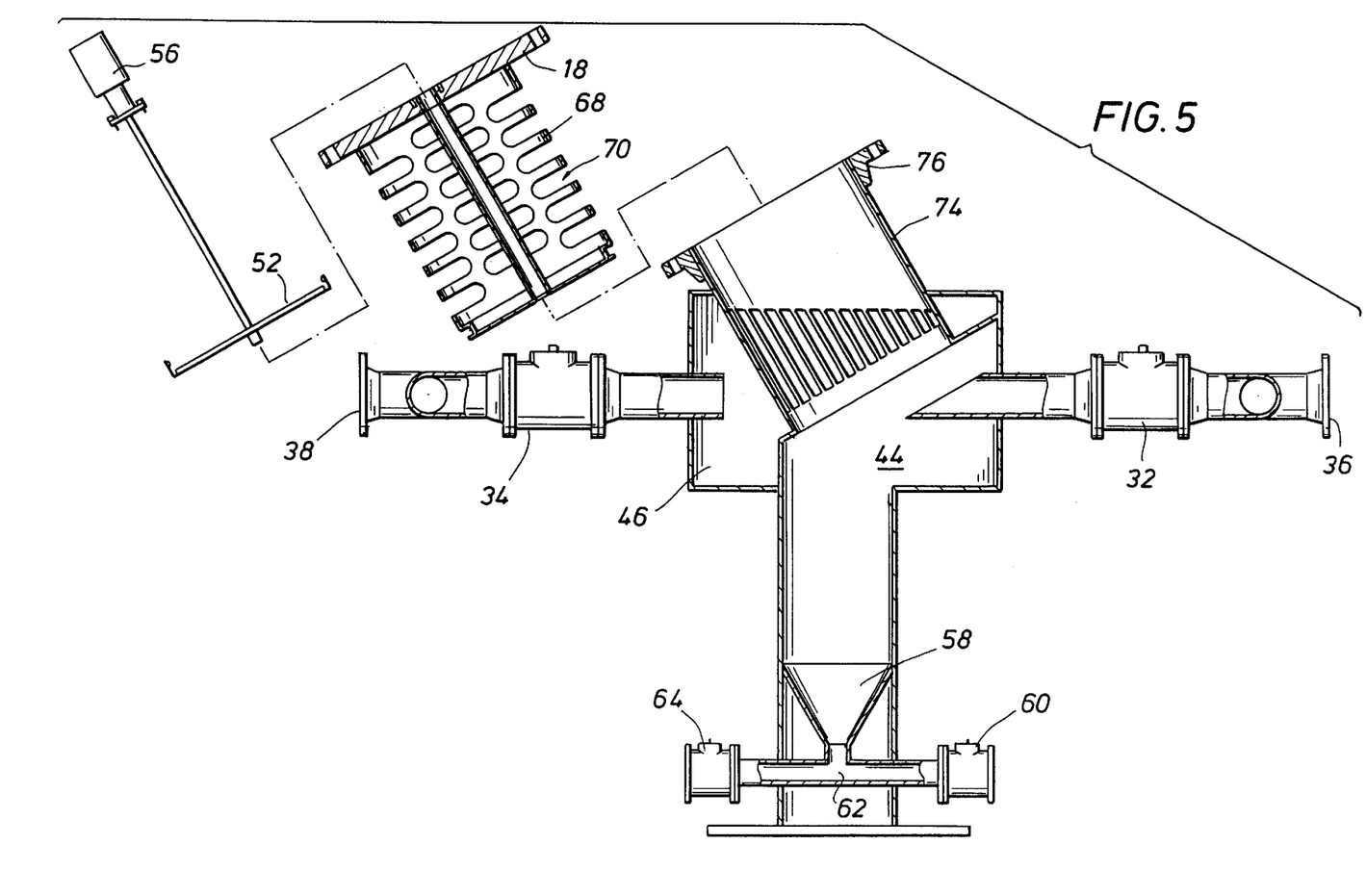
FIG. 5 depicts the section in the line of cross section A—A of FIG. 1 and further showing the exploded view of the self-cleaning strainer with all of its components except commercially available gaskets and stud bolts.

FIG. 5 shows an exploded view of the components making up the self-cleaning strainer.

Figure 6A:
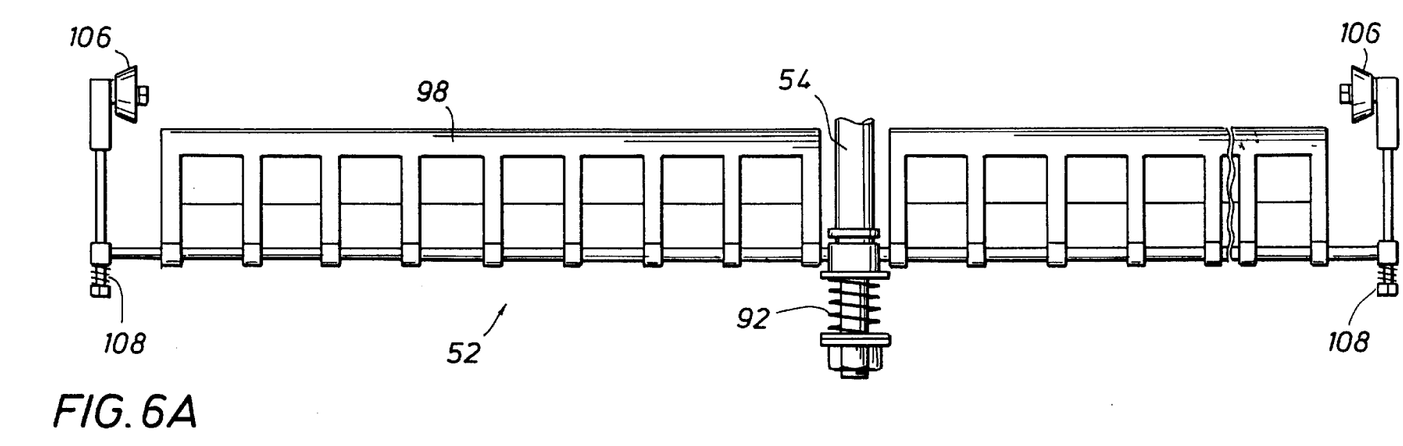
FIG. 6A depicts a lengthwise, elevation view of the wiper blade.
Figure 6B:
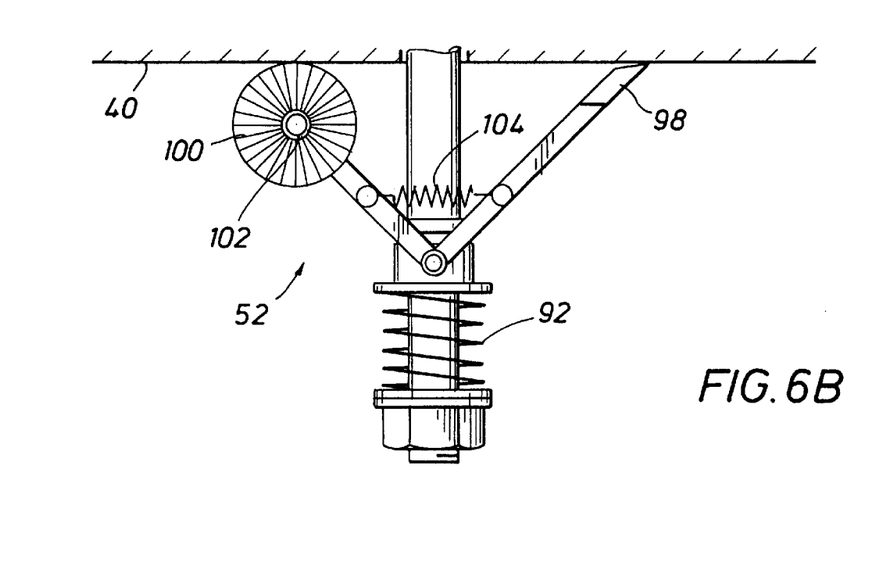
FIG. 6B depicts a side elevation view of the wiper blade providing additional details of the mounting of the blade.

FIG. 6A shows a longitudinal elevation view of the wiper blade 52. FIG. 6B provides additional details in a side view. The wiper blade 52 comprises a blade 98 with positive rake and clearance angles, similar to that of a non-carbide cutting tool. The blade 98 is designed to remove all the filtrate deposited on the surface of the porous membrane. Because of the rake and clearance angles of the tool, frictional resistance by the rubbing action of the blade on the porous membrane is minimized. The wiper blade 52 also comprises a brush 100 set on porous metal bushing 102, normally porous bronze. The circular brush 100 is designed to roll on the surface of the porous membrane 40 and aids in removing filtrate trapped near the surface but within the porous membrane. This can be removed by static action on these small particles and also by direct contact of the brush fibers on the particles. A tension spring 104 assists in forcing both the blade and the brush against the surface of the porous membrane.

FIG. 7 is an exploded view of the recess area 90 (FIG. 2), showing in greater detail the lower set of O-rings 82 of the porous membrane can 68, the porous membrane 40, the wiper blade 52, a cone shaped bearing 106 and a compression spring 108. The compression spring 108 continually ensures that the wiper blade 52 is forced on to the porous membrane 40, thus ensuring that the porous membrane is properly cleaned by the wiper blade.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. An influent liquid purifying strainer comprising:
   a. a filtration chamber comprising an inlet plenum and an outlet plenum, the inlet and outlet plenums separated by a divider plate;
   b. a porous membrane between the inlet and outlet plenums, the divider plate and the membrane together forming a boundary between the inlet and outlet plenums;
   c. a fluid outlet from the outlet plenum;
   d. a fluid inlet to the inlet plenum, the fluid inlet directing influent against the porous membrane at an angle other than perpendicular, the angle sufficient to provide a scrubbing action of the influent against the porous membrane; and
   e. a filtrate settlement sump in fluid communication with the inlet plenum, wherein the filtrate settlement sump is located below the inlet plenum.

2. The strainer of claim 1 further comprising a rotatable wiper against the porous membrane.

3. The strainer of claim 2 further comprising a motor to rotatably drive the wiper.

4. The strainer of claim 3 further comprising a first differential pressure cell to determine the fluid pressure difference between the inlet to the strainer and the outlet from the strainer.

5. The strainer of claim 4 wherein the first differential pressure cell develops a signal indicative of the determined fluid pressure difference.

6. The strainer of claim 5 wherein the motor is actuated by the signal developed by the first differential pressure cell at a first pre-determined differential pressure.

7. The strainer of claim 6, wherein the strainer comprises a first strainer and further comprising a standby strainer in parallel with the first strainer.

8. The strainer of claim 7 further comprising a second differential pressure cell to determine the fluid pressure difference between the inlet to the strainer and the outlet from the strainer.

9. The strainer of claim 8 wherein the second differential pressure cell develops a signal indicative of the determined fluid pressure difference.

10. The strainer of claim 9 wherein the signal developed by the second differential pressure cell removes the first strainer from service and places the standby strainer in service at a second predetermined differential pressure that is higher than the second predetermined differential pressure.

11. The strainer of claim 1 further comprising:
    a. a fluid inlet into the sump;
    b. a fluid outlet from the sump; and
    c. a source of fluid coupled to the fluid inlet into the sump to flush filtrate from the sump.

* * * * *